(12) United States Patent
Benson et al.

(10) Patent No.: US 12,025,494 B2
(45) Date of Patent: Jul. 2, 2024

(54) OPTICAL ELEMENTS INCLUDING HARD OXIDE BODIES AND GRATING LAYERS AND METHOD FOR MAKING THE SAME

(71) Applicant: CORNING INCORPORATED, Corning, NY (US)

(72) Inventors: Robert Gerald Benson, Keene, NH (US); George Paul Lindberg, Corning, NY (US); James Thomas McCann, Marlow, NH (US); Jeffry John Santman, Keene, NH (US); Leonard Gerard Wamboldt, Sunderland, MA (US); Joseph Francis Washer, Walpole, NH (US)

(73) Assignee: Corning Incorporated, Corning, NY (US)

( * ) Notice: Subject to any disclaimer, the term of this patent is extended or adjusted under 35 U.S.C. 154(b) by 121 days.

(21) Appl. No.: 17/842,012

(22) Filed: Jun. 16, 2022

(65) Prior Publication Data

US 2022/0412799 A1    Dec. 29, 2022

Related U.S. Application Data

(60) Provisional application No. 63/214,401, filed on Jun. 24, 2021.

(51) Int. Cl.
*G01J 3/02* (2006.01)
*G01J 3/28* (2006.01)
*G02B 1/10* (2015.01)

(52) U.S. Cl.
CPC .............. *G01J 3/0208* (2013.01); *G02B 1/10* (2013.01); *G01J 2003/2826* (2013.01)

(58) Field of Classification Search
CPC .. G01J 3/0208; G01J 2003/2826; G01J 3/021; G01J 3/0259; G01J 3/0286;
(Continued)

(56) References Cited

U.S. PATENT DOCUMENTS

| 4,281,894 A * | 8/1981 | Guha ................... G02B 27/108 359/629 |
| 4,828,356 A | 5/1989 | Hobrock et al. |

(Continued)

FOREIGN PATENT DOCUMENTS

| CN | 101799569 B | * 10/2011 |
| CN | 104536262 A | 4/2015 |

(Continued)

OTHER PUBLICATIONS

English Translation of CN101799569B Description (Year: 2011).*
(Continued)

*Primary Examiner* — Tarifur R Chowdhury
*Assistant Examiner* — Akbar H. Rizvi
(74) *Attorney, Agent, or Firm* — Kevin L. Bray

(57) ABSTRACT

An optical element includes an optical block constructed of a first material having a % transmission of at least 50% throughout a spectral range of 300 nm to 2700 nm through at least a thickness of the optical block. The optical block comprises a surface. A grating layer constructed of a second material is disposed on the surface of the optical block, the grating layer comprising a second surface that is directly in contact with the surface of the optical block and a first surface comprising a plurality of diffraction features forming a diffraction grating.

20 Claims, 4 Drawing Sheets

(58) Field of Classification Search
CPC .......... G01J 3/18; G02B 1/10; G02B 5/1847; G02B 5/1861
See application file for complete search history.

(56) References Cited

U.S. PATENT DOCUMENTS

| | | | |
|---|---|---|---|
| 6,423,969 | B1 | 7/2002 | Amon |
| 7,330,258 | B2 | 2/2008 | Warren |
| 7,697,137 | B2 | 4/2010 | Comstock, II |
| 7,898,660 | B2 | 3/2011 | Warren |
| 9,435,689 | B2 | 9/2016 | Comstock, II et al. |
| 9,739,950 | B2 | 8/2017 | Sqalli et al. |
| 2004/0229553 | A1* | 11/2004 | Bechtold ............ B24B 13/01 451/42 |
| 2006/0262250 | A1* | 11/2006 | Hobbs ............... G02B 5/3058 349/96 |
| 2006/0268269 | A1* | 11/2006 | Warren .............. G01J 3/0205 356/328 |
| 2007/0252989 | A1* | 11/2007 | Comstock .......... G01J 3/2823 356/328 |
| 2009/0028471 | A1 | 1/2009 | Tan |
| 2014/0118738 | A1* | 5/2014 | Comstock, II ....... G01J 3/021 29/527.1 |
| 2016/0054489 | A1* | 2/2016 | Koshitouge ........ G02B 5/0294 257/98 |
| 2016/0161334 | A1* | 6/2016 | Shibayama ........ G01J 3/0262 356/402 |
| 2019/0346737 | A1* | 11/2019 | Zhao .................. G02F 1/355 |

FOREIGN PATENT DOCUMENTS

| | | |
|---|---|---|
| CN | 105731363 A | 7/2016 |
| EP | 2175299 B1 | 12/2016 |

OTHER PUBLICATIONS

Mark Craig Gerchrnan, "Specifications And Manufacturing Considerations Of Diamond Machined Optical Components," Optical Component Specifications for Laser-based Systems and Other Modern Optical Systems, vol. 607, Jul. 1986, pp. 36-53; https://doi.org/10.1117/12.956360.

Rhorer, R. et al., "Fabrication of Optics by Diamond Turning", Chapter 10, Handbook of Optics, McGraw-Hill, Columbus, OH, Retreived on Oct. 28, 2022 [online], https://tsapps.nist.gov/publication/get_pdf.cfm?pub_id=823345 (Accessed Jun. 18, 2021).

* cited by examiner

OPTICAL ELEMENTS INCLUDING HARD OXIDE BODIES AND GRATING LAYERS AND METHOD FOR MAKING THE SAME

This Application claims the benefit of priority to U.S. Provisional Patent Application Ser. No. 63/214,401 filed on Jun. 24, 2021, the content of which is relied upon and incorporated herein by reference in its entirety.

BACKGROUND

Field

The present specification generally relates to diffractive optical elements offering relatively high % transmission over wide wavelength ranges of interest. The diffractive optical elements of the present disclosure may be employed in hyperspectral imaging systems as components of a spectrometer block.

Technical Background

Spectrometers disperse incoming light into a plurality of spectral components to facilitate detection and analysis of the spectral components. Spectrometers find use in a variety of applications, including, but not limited to hyperspectral imaging systems. Such systems may include fore optics for collecting incoming light, a spectrometer block to separate the incoming light into a plurality of spectral components, and a detector that receives the spectral components and generates imagery of a scene of interest, including at each wavelength, in a spectral range from 400 nm to 2500 nm. Hyperspectral images may be used in remote sensing systems deployed on aircraft and other vehicles and may operate in a variety of spectral ranges of interest. Whether a particular hyperspectral imaging system performs suitably within a particular spectral range of interest is dependent on a number of factors, including, but not limited to, the sensitivity of the detector within a particular spectral range and the % transmission of the material out of which the spectrometer block is formed. Detectors that possess the requisite sensitivity over a wide wavelength ranges (e.g., extending from the visible and into the infrared) may require cooling to cryogenic temperatures. Such cooling of the detector may expose the spectrometer block to relatively large variations in temperature over short time periods, potentially leading to thermal compression and expansion that may degrade various components thereof.

Accordingly, a need exists for a thermally stable diffractive optical element that includes a relatively high % transmission over a relatively wide wavelength range extending from the visible into the infrared.

SUMMARY

A first aspect of the present disclosure includes an optical element including an optical block constructed of a first material having a % transmission of at least 50% throughout a spectral range of 300 nm to 2700 nm through at least a thickness of the optical block. The optical block comprises a surface. A grating layer constructed of a second material is disposed on the surface of the optical block, the grating layer comprising a second surface that is directly in contact with the surface of the optical block and a first surface comprising a plurality of diffraction features forming a diffraction grating.

A second aspect of the present disclosure includes an optical element according to the first aspect, wherein the first material comprises a hardness of greater than Knoop 500 and the second material comprises a hardness of less than or equal to Knoop 300.

A third aspect of the present disclosure includes an optical element according to any of the first through the second aspects, wherein the first material comprises yttrium aluminum garnet.

A fourth aspect of the present disclosure includes an optical element according to any of the first through the third aspects, further comprising one or more additional reflective layers disposed directly on the optical block, the one or more additional reflective layers defining an optical path extending through the optical block from a light incidence surface of the optical element, wherein light incident on the optical element at the light incidence surface reflects off both the one or more additional reflective layers and the reflective layer disposed on the grating layer.

A fifth aspect of the present disclosure includes an optical element according to any of the first through the fourth aspects, wherein: the optical path comprises a length that is greater than or equal to 10 cm; and the % transmission of the first material is at least 70% throughout the spectral range along an entirety of the optical path.

A sixth aspect of the present disclosure includes an optical element according to any of the first through the fifth aspects, wherein the second material is a zinc chalcogen.

A seventh aspect of the present disclosure includes an optical element according to any of the first through the sixth aspects, wherein the second material includes one or more of ZnS, ZnSe, ZnO, and ZnSO.

An eighth aspect of the present disclosure includes an optical element according to any of the first through the seventh aspects, wherein the grating layer comprises a grating layer thickness that is greater than or equal to 10 µm and less than or equal to 100 µm.

A ninth aspect of the present disclosure includes an optical element according to any of the first through the eighth aspects, wherein: the plurality of diffraction features comprises a plurality of grooves disposed on the first surface, and the plurality of grooves extend inward toward the second surface by no more than half of a thickness of the grating layer.

A tenth aspect of the present disclosure includes an optical element according to any of the first through the ninth aspects, wherein each of the plurality of grooves comprises a dual faced blaze surface.

An eleventh aspect of the present disclosure includes an optical element according to any of the first through the tenth aspects, wherein the surface of the optical block comprises a curved portion and an entirety of the grating layer is disposed on the curved portion.

A twelfth aspect of the present disclosure includes an optical element according to any of the first through the eleventh aspects, wherein the optical block is a monolithic spectrometer comprising: an entrance slit initiating an optical path through the monolithic spectrometer; a first reflector facing the entrance slit to reflect light propagating through the entrance slit onto the grating layer; and an exit surface positioned to refract the light after being diffracted by the grating layer out of the monolithic spectrometer.

A thirteenth aspect of the present disclosure includes an optical element according to any of the first through the twelfth aspects, wherein the first material comprises a coefficient of thermal expansion ("CTE") of less than or equal to $15.0 \times 10^{-6} K^{-1}$.

A fourteenth aspect of the present disclosure includes a hyperspectral imaging system comprising: a detector; a monolithic spectrometer configured to direct light to the detector along an optical path within the monolithic spectrometer, wherein the monolithic spectrometer is constructed of a first material having a % transmission of at least 50% throughout a spectral range of 300 nm to 2700 nm along an entirety of the optical path; and a grating layer constructed of a second material disposed on a surface of the monolithic spectrometer, the grating layer comprising a second surface that is directly in contact with the surface of the monolithic spectrometer, and a first surface comprising a plurality of diffraction features forming a diffraction grating such that the light is diffracted by the diffraction grating prior to reaching the detector.

A fifteenth aspect of the present disclosure includes a hyperspectral imaging system according to the fourteenth aspect, wherein: the optical path comprises a length that is greater than or equal to 10 cm; and the % transmission of the first material is at least 70% throughout the spectral range along an entirety of the optical path.

A sixteenth aspect of the present disclosure includes a hyperspectral imaging system to any of the fourteenth through the fifteenth aspects, wherein the monolithic spectrometer comprises: an entrance slit initiating the optical path through the monolithic spectrometer; a first reflector facing the entrance slit to reflect light propagating through the entrance slit onto the grating layer; and an exit surface positioned to refract the light after being diffracted by the grating layer out of the monolithic spectrometer onto the detector.

A seventeenth aspect of the present disclosure includes a hyperspectral imaging system according to any of the fourteenth through the sixteenth aspects, wherein the first material comprises a hardness of greater than Knoop 500 and the second material comprises a hardness of less than or equal to Knoop 300.

An eighteenth aspect of the present disclosure includes a hyperspectral imaging system according to any of the fourteenth through the seventeenth aspects, wherein the first material comprises yttrium aluminum garnet.

A nineteenth aspect of the present disclosure includes a hyperspectral imaging system according to any of the fourteenth through the eighteenth aspects, wherein the second material is a zinc chalcogen.

A twentieth aspect of the present disclosure includes a hyperspectral imaging system according to any of the fourteenth through the nineteenth aspects, wherein the second material is one or more of ZnS, ZnSe, ZnO, ZnSO, and ZnSbO.

A twenty first aspect of the present disclosure includes a hyperspectral imaging system according to any of the first through the twentieth aspects, wherein: the grating layer comprises a thickness that is greater than or equal to 10 µm and less than or equal to 100 µM; the plurality of diffraction features comprises a plurality of grooves disposed on the first surface, and the plurality of grooves extend inward toward the second surface by no more than half the thickness.

A twenty second aspect of the present disclosure includes a method of fabricating an optical element comprising: forming a grating pocket in a workpiece of a non-diamond machinable material using a deterministic polishing technique; depositing a layer of a diamond machinable material onto the workpiece within the grating pocket; patterning a negative of a diffraction grating on an exposed surface of the layer of the diamond machinable material using diamond turning; and depositing a reflective layer on the exposed surface to form a reflective grating that diffracts light propagating through the workpiece onto the diffraction grating.

A twenty third aspect of the present disclosure includes a method according to the twenty second aspect, wherein the first material comprises yttrium aluminum garnet.

A twenty fourth aspect of the present disclosure includes a method according to any of the twenty second through the twenty third aspects, wherein the second material comprises a zinc chalcogen.

A twenty fifth aspect of the present disclosure includes a method according to any of the twenty second through the twenty fourth aspects, wherein the second material comprises one or more of ZnS, ZnO, ZnSe, ZnSO, and ZnSbO.

A twenty sixth aspect of the present disclosure includes a method according to any of the twenty second through the twenty fifth aspects, wherein the depositing the layer of the second material is performed via chemical vapor deposition or sputtering.

A twenty seventh aspect of the present disclosure includes a method according to any of the twenty second through the twenty sixth aspects, wherein the layer of the second material comprises a thickness that is greater than or equal to 10 µm and less than or equal to 100 µm.

A twenty eighth aspect of the present disclosure includes a method according to any of the twenty second through the twenty seventh aspects, wherein the negative of the diffraction grating comprises a plurality of grooves extending into the layer of the second material by no more than half the thickness.

A twenty ninth aspect of the present disclosure includes a method according to any of the twenty second through the twenty eighth aspects, further comprising: forming an entrance slit on an entrance surface of the workpiece by depositing a layer of opaque material on the entrance surface; and depositing one or more sections of reflective material on an exterior surface of the workpiece to form one or more mirrors that form an optical path that extends from the entrance slit and comprises the diffraction grating.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
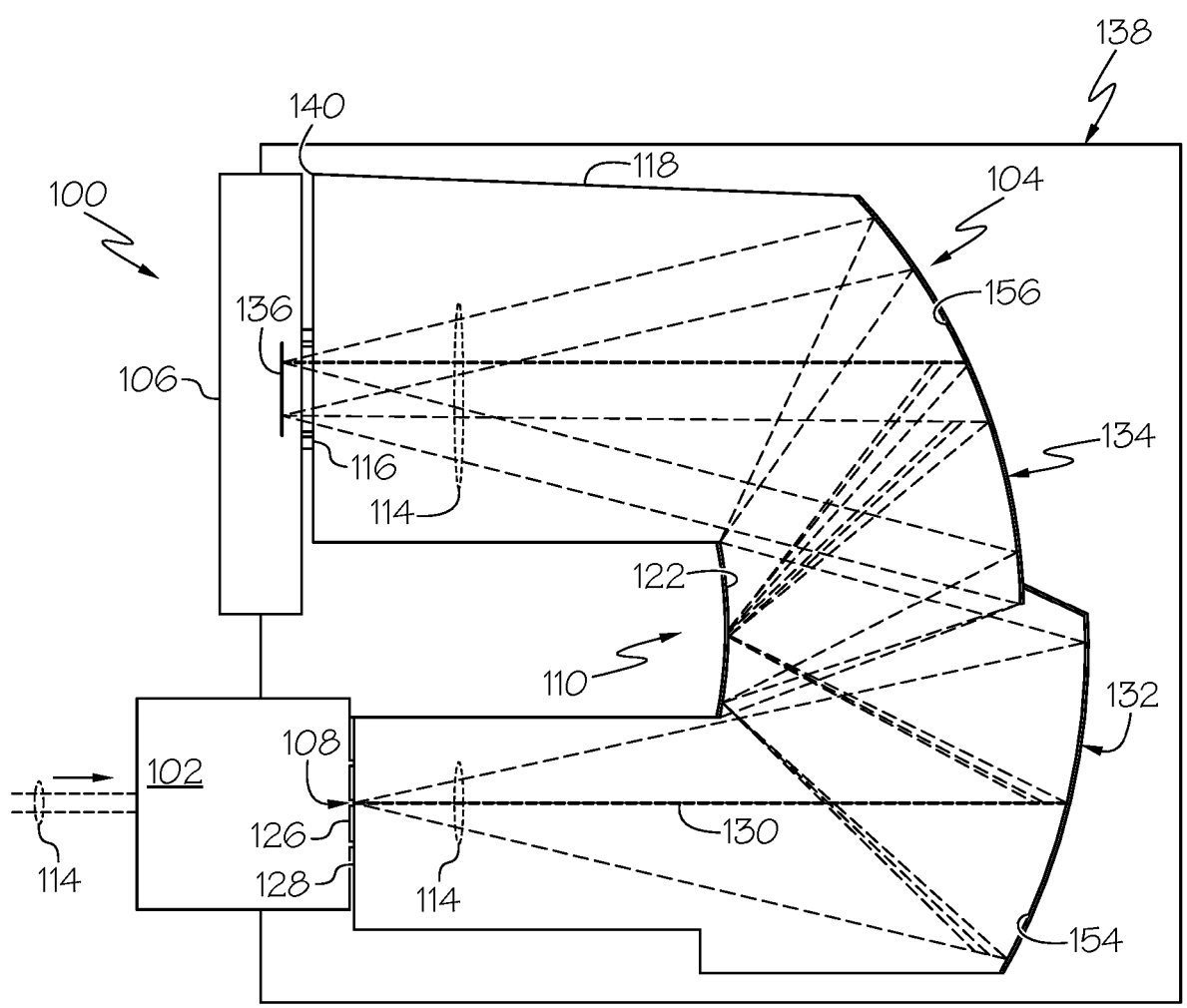
FIG. 1A schematically depicts a hyperspectral imaging system including an optical element including a diffraction grating, according to one or more embodiments described herein.

Reference will now be made in detail to embodiments vis-á-vis optical elements including optical blocks and grating layers that are constructed of different materials to facilitate the optical blocks having a relatively high % transmission along optical paths extending therethrough while maintaining operability when subjected to substantial temperature deviations. In embodiments, the optical blocks of the optical elements described herein are constructed of a first material having a % transmission of greater than or equal to 50% (e.g., greater than or equal to 70%) at each wavelength over a spectral range of greater than or equal to 300 nm to less than or equal to 2700 nm along an optical path extending therethrough. In embodiments, the first material comprises an absorption coefficient that is less than or equal to 0.050/cm (e.g., less than or equal to 0.049/cm, less than or equal to 0.048/cm, less than or equal to 0.047/cm, less than or equal to 0.046/cm). In embodiments, the first material comprises a coefficient of thermal expansion ("CTE") of less than or equal to $15.0 \times 10^{-6}$ $K^{-1}$ and a hardness greater than Knoop 500 (e.g., greater than or equal to 1000 Knoop, greater than or equal to 1200 Knoop). A grating layer of a second material may be disposed on a surface of the optical block and include a plurality of diffraction features on an exterior-facing surface thereof forming a diffraction grating. In embodiments, the second material comprises a CTE of less than or equal to $20 \times 10^{-6}$ $K^{-1}$ (e.g., greater than or equal to $5 \times 10^{-6}$ $K^{-1}$ and/or less than or equal to $10 \times 10^{-6}$ $K^{-1}$) and a hardness of less than or equal to Knoop 300 (e.g., less than or equal to Knoop 200, approximately or equal to Knoop 160). A reflective layer may be disposed on the exterior-facing surface of the grating layer to form a reflective grating for light that is incident on the optical block and propagates through the optical block prior to reaching the grating layer.

Constructing the optical block and the grating layer from different material may improve the optical performance of the optical elements of the present disclosure by permitting the optical block to be constructed of materials that possess high transmission over a desired spectral range of interest and CTEs that are compatible with temperature fluctuations associated with particular operating environments. In embodiments, for example, the optical elements of the present disclosure may be incorporated into hyperspectral imaging systems as monolithic spectrometer blocks. Such hyperspectral imaging systems may include high sensitivity focal plane array detectors for providing high resolution imaging capabilities over a relatively wide spectral range. Such focal plane array detectors (e.g., high quantum efficiency CMOS focal plane arrays) may be cryogenically cooled inside a cryogenic dewar to provide high resolution imaging. In embodiments, the optical elements of the present disclosure may be integrated with (or at least partially into) the cryogenic dewar, subjecting the optical block to wide temperature fluctuations over relatively short time periods. The construction of the optical blocks described herein, by including the first material meeting with the CTE characteristics described herein, beneficially maintains the operability thereof even when encountering such temperature fluctuations. Materials typically used to construct monolithic spectrometer blocks may possess relatively high CTEs, resulting in existing monolithic spectrometer blocks being subjected to stresses, strains, and/or other loads during such temperature fluctuations, which may result in various operational defects (e.g., cracks, index variations, birefringence, or the like) therein. The grating layers described herein permit construction of optical blocks out of materials having favorable thermal and optical properties, while permitting fabrication of suitable diffraction gratings using diamond machining (e.g., diamond turning) techniques.

The term "CTE," as used herein, refers to the average coefficient of thermal expansion over a temperature range from about 50 K to about 400 K, unless stated otherwise.

As used herein, the term "throughout," when used in reference to a spectral range with respect to a particular property (e.g., % transmission), means that the property is present at each wavelength in the spectral range. As such, the phrase "% transmission of at least 50% throughout a spectral range of 300 nm to 2700 nm" means that the % transmission is greater than or equal to 50% at each wavelength in the spectral range from 300 nm to 2700 nm.

As used herein, the term "% transmission" refers to a measured portion of an optical signal that is incident on an object (e.g., an optical block of any of the optical elements described herein) that is transmitted therethrough. Herein, % transmission is expressed as a percentage quantifying a ratio between an incoming optical signal initially incident on an object to an outgoing optical signal that propagates after being transmitted through at least a portion of the object. % transmission "along an optical path," as described herein, refers to a percentage of such an outgoing signal after the optical signal propagates along a specified or shown propagation path through an optical element determined by one or more of the shape of the optical element and other features (e.g., diffractive elements, reflective surfaces, etc.) of the optical element. % transmission is measured via a suitable detection means measurement measuring a power of an incoming optical signal and a power of an outgoing optical signal, such that surface reflections are accounted for in the measurement of % transmission.

As used herein, the term "optical path" refers to a propagation path of a ray of light of an optical signal through an optical element from an entrance surface (e.g., at which the optical signal is initially incident on the optical element) to an exit surface of the optical element (e.g., representing an interface between the optical element and a material external to the optical element). The entrance and exit surfaces of the optical element may be dictated at least in part by other features (e.g., diffraction elements, reflective surfaces) of the optical element. In certain examples, the entrance surface and the exit surface may be the same surface of the optical element.

Unless specified otherwise, indices of refraction described herein are measured at the d-line (587.56 nm).

Figure 1B:
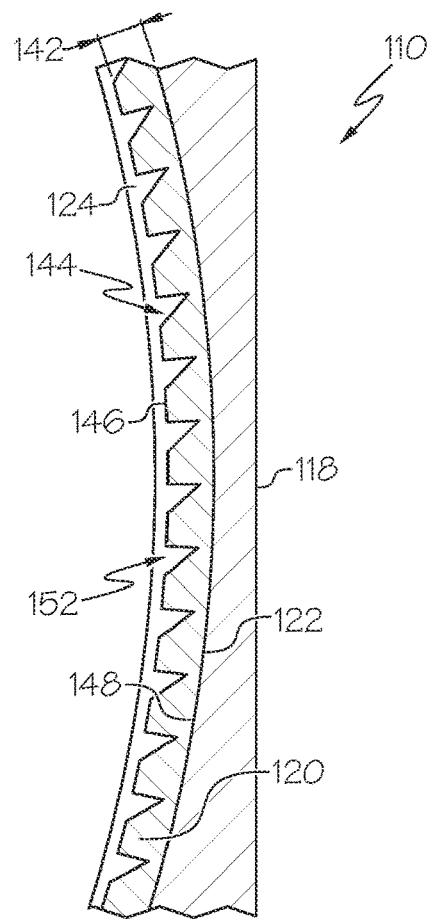
FIG. 1B schematically depicts a grating layer disposed on an optical block of the optical element of FIG. 1A to form the diffraction grating thereof, according to one or more embodiments described herein.
Figure 1C:
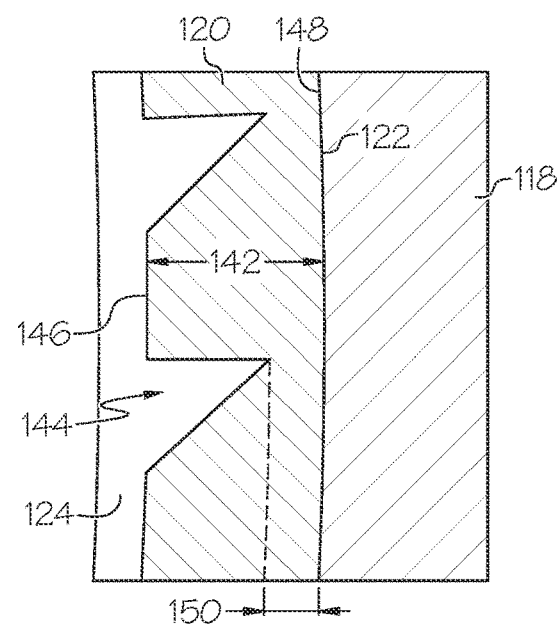
FIG. 1C schematically depicts a close-up view of the grating layer of FIG. 1B being patterned with a plurality of diffraction features to form the diffraction grating of FIGS. 1A and 1B, according to one or more embodiments described herein.

Referring now to FIGS. 1A-1C, a hyperspectral imaging system 100 including an optical element 104 and a diffraction grating 110 is schematically depicted in accordance with an example embodiment of the present disclosure. FIG. 1A schematically depicts various components of the hyperspectral imaging system 100. FIG. 1B schematically depicts a close-up view of a diffraction grating 110 of the hyperspectral imaging system 100. FIG. 1C depicts a close-up view of a portion of the diffraction grating 110 of FIGS. 1A and 1B. With reference to FIG. 1A, the hyperspectral imaging system 100 is depicted to include fore-optics 102, an optical element 104, and a detector 106 with detector element 136. In embodiments, the optical element 104 is a monolithic spectrometer and includes an entrance slit 108 and a diffraction grating 110. In embodiments, the optical element 104 comprises one or more reflectors (not depicted in FIG. 1A) that are positioned to direct and/or focus light 114 from a scene or object of interest onto the diffraction grating and/or focus the light 114 onto the detector 106. The diffraction grating 110 diffracts the light 114 from a scene or object of interest into a plurality of spectral components, which are directed (e.g., via one or more reflectors, directly from the diffraction grating, etc.) through an exit surface 116 of the optical element 104 onto the detector 106. The detector 106 may produce images of the object or scene interest over a contiguous range of narrow spectral bands, with each of the narrow spectral bands falling generally within a spectral range of interest.

While the optical element 104 is implemented as a monolithic spectrometer of the hyperspectral imaging system 100 in the depicted embodiment, it should be appreciated that the optical element 104 may take other forms in various embodiments. In embodiments, for example, the optical element 104 may only include the diffraction grating 110 while the remaining components of the hyperspectral imaging system 100 may be omitted. The diffraction grating 110 described herein with respect to FIGS. 1A-1C may be implemented with a number of different combination of other optical elements in accordance with the present disclosure to perform various operations on the light 114.

With reference to FIGS. 1A-1C, the optical element 104 includes an optical block 118, a grating layer 120 disposed on a surface 122 of the optical block 118, and a reflector layer 124 disposed on the grating layer 120. In embodiments, the optical block 118 includes a first material, the grating layer 120 includes a second material, and the reflector layer 124 includes a third material. The first, second, and third materials may be selected depending on an intended mode of operation of the optical element 104 including, but not limited to, the spectral range of interest of the light 114 that the narrow spectral bands, associated with the images generated by the detector 106, fall into, and the operational environment of the hyperspectral imaging system 100 (e.g., the temperatures to which the optical block 118 is exposed to).

The first material of the optical block 118 may be selected to have a % transmission determined based on, for example, a desired dynamic range of the hyperspectral imaging system 100 and the configuration of the optical element 104. As shown in FIG. 1A, for example, the fore-optics 102 are configured to direct the light 114 through the entrance slit 108 into the optical block 118. In embodiments, the fore-optics 102 include one or more optical elements (e.g., lenses, mirrors, or the like) that direct and/or focus the light 114 from the scene of interest through the entrance slit 108 of the optical element 104. The entrance slit 108, in one embodiment, comprises an opening in a layer of opaque material 126 disposed on an entrance surface 128 of the optical block 118. In embodiments, the entrance slit 108 is aligned with an optical axis of the fore-optics 102 and defines an optical path 130 extending between the entrance surface 128 and the exit surface 116. In embodiments, the optical path 130 may be formed by additional components of the optical element 104. For example, in embodiments, the optical element 104 includes a first reflector 132 facing the entrance surface 128 and configured to direct the light 114 onto the diffraction grating 110. In embodiments, the optical element 104 includes a second reflector 134 facing the diffraction grating 110 and configured to direct the light 114 from the diffraction grating 110 (e.g., after being diffracted thereby) through the exit surface 116 onto a detector element 136 of the detector 106. As such, the optical path 130 extending between the entrance surface 128 and the exit surface 116 includes a length depending on the positioning and configuration of the diffraction grating 110, relative to any other components of the optical element 104 (e.g., reflectors formed on surfaces of the optical block 118, such as the first reflector 132 and the second reflector 134). In embodiments, the optical path 130 is greater than or equal to 10 cm in length (e.g., greater than or equal 10.5 cm, greater than or equal to 11 cm, greater than or equal to 11.5 cm, greater than or equal to 12.0 cm, greater than or equal to 12.5 cm, greater than or equal to 13.0 cm, greater than or equal to 15 cm).

In embodiments, the first material of the optical block 118 may be selected to have a % transmission of greater than or equal to 50% over an entirety of the length of the optical path 130. In embodiments, the first material of the optical block 118 comprises a % transmission of greater than or equal to 80% per 3 mm of length of the optical path 130. In embodiments, the first material of the optical block 118 may be selected to have such a % transmission over an entirety of a spectral range of interest into which the narrow spectral bands used to generate images of the source of the light 114 fall. In embodiments, for example, the first material of the optical block 118 may be selected to have a % transmission of greater than or equal to 70% over a spectral range of interest that extends through an entirety of the visible spectrum and at least part of the infrared spectrum. In embodiments, the spectral range of interest includes each wavelength in a wavelength range that extends from 300 nm to 2700 nm. In embodiments, the first material of the optical block 118 may be selected to have a % transmission of greater than or equal to 50%, or greater than or equal to 60%, or greater than or equal to 70% at each wavelength in a range with wavelengths that are greater than or equal to 300 nm and less than or equal to 2700 nm.

In embodiments, the first material of the optical block 118 is selected to have an index of refraction of greater than or equal to 1.7 (e.g., greater than or equal to 1.75, greater than or equal to 1.80, greater than or equal to 1.83). An index of refraction meeting such requirements may beneficially facilitate rendering the optical block 118 more compact than embodiments including first materials having lower indices of refraction (e.g. by allowing greater dispersion of the spectral components of the light 114). In embodiments, the optical block 118 is constructed to include a volume of less than or equal to 20 cm$^3$ (e.g., less than or equal to 15 cm$^3$, less than or equal to 14 cm$^3$, less than or equal to 13 cm$^3$, less than or equal to 12.5 cm$^3$). Such compactness of the optical block 118 facilitates tactical use of the hyperspectral imaging system 100 (e.g., on aircraft such as an unmanned aerial vehicle).

The first material of the optical block 118 may also be selected to provide long-term operability (e.g., durability). Depending on the construction of the hyperspectral imaging system 100, the durability of the optical block 118 may be affected by temperature fluctuations encountered by the optical block 118. In the depicted embodiment, for example, the optical block 118 is disposed in a housing 138 to which the detector 106 is attached. In embodiments, the housing 138 is cooled to facilitate cooling the detector element 136. In embodiments, the detector element 136 includes a charge-coupled device (CCD) or a complementary metal-oxide semiconductor (CMOS)-based sensor including a plurality of cells that convert the light 114 into electrical signals used to generate images. In embodiments, the detector element 136 includes a CMOS focal plane array. Such sensors are sensitive to operating temperatures, with higher temperatures being associated with higher thermal noise and therefore diminished imaging performance (e.g., diminished resolution). Accordingly, in embodiments, the detector 106 comprises a cooling system (not depicted) configured to maintain a temperature thereof within a suitable operating range during imaging. The temperature may depend on the particular spectral range of interest. In embodiments, the cooling system may expose the detector element 136 to temperatures of less than or equal to 200 K (e.g., less than or equal to 175 K, less than or equal to 150 K, less than or equal to 100 K, less than or equal to 125 K, less than or equal to 100 K, less than or equal to 75K, less than or equal to 50 K).

As a result of the cooling system, the optical block 118 may encounter substantial temperature fluctuations over the course of relatively short time periods. In embodiments, from a pre-imaging configuration, the housing 138 may be cooled from room temperature to 175 K or less over the span of 20 minutes. As such, the optical block 118 may be subjected to temperature variations of greater than or equal to 100 K (e.g., greater than or equal to 125 K, greater than or equal to 150 K, greater than or equal to 175 K, greater than or equal to 200 K, greater than or equal to 225 K). During such temperature fluctuations, the optical block 118 may expand and/or contract significantly depending on the thermal properties of the first material. In embodiments, the CTE of the first material of the optical block 118 is selected to have a CTE of less than or equal to $15.0 \times 10-6$ K$-1$ to aid in reducing effects of thermal expansion and contraction on optical performance.

In embodiments, the first material of the optical block 118 is selected to meet both the optical (e.g. both the index of refraction and % transmission requirements described herein) and the thermal requirements (e.g. CTE) described herein. In embodiments, materials meeting such requirement include hard oxides. As used herein, the term "hard oxide" encompasses oxide materials having a hardness that is greater than or equal to Knoop 500. In embodiments, the first material of the optical block 118 is a garnet, such as yttrium aluminum garnet (YAG). In embodiments, the first material of the optical block 118 is constructed of aluminum oxynitride, spinel, perovskite, strontium titanate, single-crystal silicon carbide, magnesium oxide, or sapphire.

With reference to FIGS. 1B and 1C, construction of the optical block 118 out of a hard oxide material such as undoped YAG creates other obstacles in constructing the optical element 104. Various characteristics of hard oxides may render them unsuitable for diamond machining (e.g., diamond turning) techniques typically used to directly form the diffraction grating 110 directly on the surface 122 of the optical block 118. For instance, the high hardness of the optical block 118 may result in excessive wear of the diamond machining tool. Additionally, the oxides present in the first material may undergo reactions with the diamond tool, resulting in carbide formation and chemical wear of the diamond tool. Accordingly, the optical element 104 further comprises the grating layer 120 disposed on the surface 122. The grating layer 120 is formed of a second material that is different from the first material of the optical block 118. In embodiments, the second material includes a hardness of less than or equal to Knoop 300 and is constructed to avoid wear to diamond tools to a greater extent than the first material of the optical block 118. In embodiments, the grating layer 120 is deposited directly on the surface 122 of the optical block 118 via chemical vapor deposition, sputtering, or any other suitable deposition technique.

As depicted in FIG. 1B, the surface 122 upon which the grating layer 120 is disposed comprises a concave surface forming a grating cavity 152 into which the grating layer 120 is disposed via the techniques described herein. As a result of the concavity of the surface 122, the light 114 encountering the grating layer 120 from the optical block 118 encounters a convex diffraction grating, which facilitates separation of the spectral components of the light 114 and a compact construction of the optical element 104. The grating layer 120 is shown to have a thickness 142 perpendicular to the surface 122. In embodiments, the thickness 142 is greater than or equal to 10 µm and less than or equal to 100 µm (e.g., greater than or equal to 20 µm and less than or equal to 100 µm, greater than or equal to 40 µm and less than or equal to 50 µm). Having a thickness of less than 100 µm may be beneficial in that such a thin grating layer 120 may expand the materials that may be used as the second material, as native absorption effects and scattering may be reduced. Having a thickness of at least 10 µm or 20 µm in some embodiments may eliminate spectral interference that disrupts operation of the grating layer 120 as a diffraction grating.

In embodiments, the second material of the grating layer 120 is selected to have optical qualities that are compatible with the imaging application of the hyperspectral imaging system 100 and to be formable on the surface 122 using suitable deposition methods (e.g., chemical vapor deposition, sputtering, plating, or other suitable deposition method). In embodiments, the second material is selected to lack absorption peaks within the spectral range of interest for the hyperspectral imaging system 100. The thickness 142 meeting the requirements described herein beneficially renders % transmission requirements less stringent to still provide the hyperspectral imaging system 100 with a suitable dynamic range. In embodiments, the second material is selected in accordance with such optical and deposition requirements and to further to cause less wear (e.g., chemical wear, mechanical wear) than the optical block 118.

In embodiments, the second material may be a zinc chalcogen layer. In embodiments, the second material is a zinc-containing layer and includes one or more of ZnS, ZnSe, ZnO, and $ZnS_xO_{1-x}$ (ZnSO). The oxygen in such materials may result in a certain level of oxidation of a diamond turning tool, but the lower hardness (e.g., of less than or equal to 300 Knoop) may render them suitable for diamond machining techniques. In embodiments, the second material of the grating layer 120 is formed from another suitable material (e.g., gallium lanthanum sulfide).

As depicted in FIGS. 1B and 1C, the grating layer 120 comprises a plurality of diffraction features 144 therein that form a diffraction grating. The plurality of diffraction features 144 may include a plurality of microstructures that are sized on the order of the wavelength of the light 114 (see FIG. 1A) to diffract the light 114. In the depicted embodiment, the plurality of diffraction features 144 are grooves extending inward from a first surface 146 of the grating layer 120 towards a second surface 148 of the grating layer 120 that is in direct contact with the optical block 118. In embodiments, the first surface 146 follows a curved contour (e.g. a spherical surface, a toroidal surface, an aspheric surface, a freeform surface, etc.). The plurality of diffraction features 144 may include a variety of different surface shapes. In embodiments, the plurality of diffraction features 144 comprise blazed surfaces (e.g., single or dual facet blazed surfaces, powered blazed surfaces) which are tilted at a blaze angle that varies across the first surface 146. In embodiments the plurality of diffraction features 144 are diamond turned onto the first surface 146 using a negative of a diffraction grating pattern that the light 114 (see FIG. 1A) is incident on.

As depicted in FIG. 1C, the plurality of diffraction features 144 extend inward from the first surface 146 towards the optical block 118 such that no less than a minimum thickness 150 of the grating layer 120 remains between the plurality of diffraction features 144 and the optical block 118. In embodiments, the minimum thickness 150 is greater than or equal to half of the thickness 142 of the grating layer 120 (see FIG. 1B) to prevent spectral interference disrupting operation of the grating layer 120. As depicted in FIGS. 1B and 1C, the diffraction grating 110 also includes a reflector layer 124 disposed on the first surface 146 of the grating layer 120. In embodiments, the reflector layer 124 is constructed of a suitable metallic material (e.g. silver, gold, platinum) for directing the light 114 along the optical path 130 (see FIG. 1A) defined by the optical block 118. The reflector layer 124 may be deposited on the grating layer 120 using sputtering or other suitable deposition technique.

With reference to FIG. 1A, the optical block 118 may include a variety of surface structures to facilitate guiding the light 114 from the entrance surface 128 to the detector element 136. For example, external surfaces (e.g., a first curved surface 154 on which the first reflector 132 is formed, a second curved surface 156 on which the second reflector 134 is formed) of the optical block 118 may have a wide variety of shapes depending on the implementation (e.g., spherical, toroidal, toroid aspheric, freeform) to guide the light 114 along a desired optical path 130. In embodiments, reflectors of the optical element 104 are formed using methods similar to those described herein with respect to the reflector layer 124 disposed on the grating layer 120. Such reflectors may be disposed directly on external surfaces of the optical block 118 (whether curved or planar in shape) to form a desired optical path 130.

Figure 2:
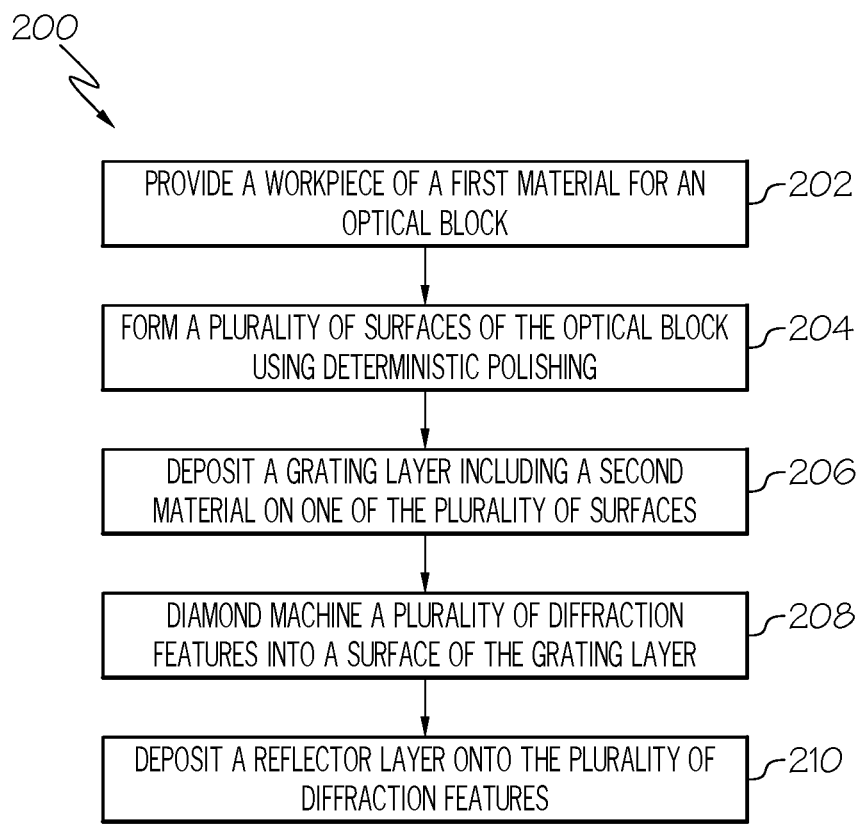
FIG. 2 depicts a flow diagram of a method of forming a diffraction grating by depositing a grating layer on an optical block, according to one or more embodiments described herein.
Figure 3:
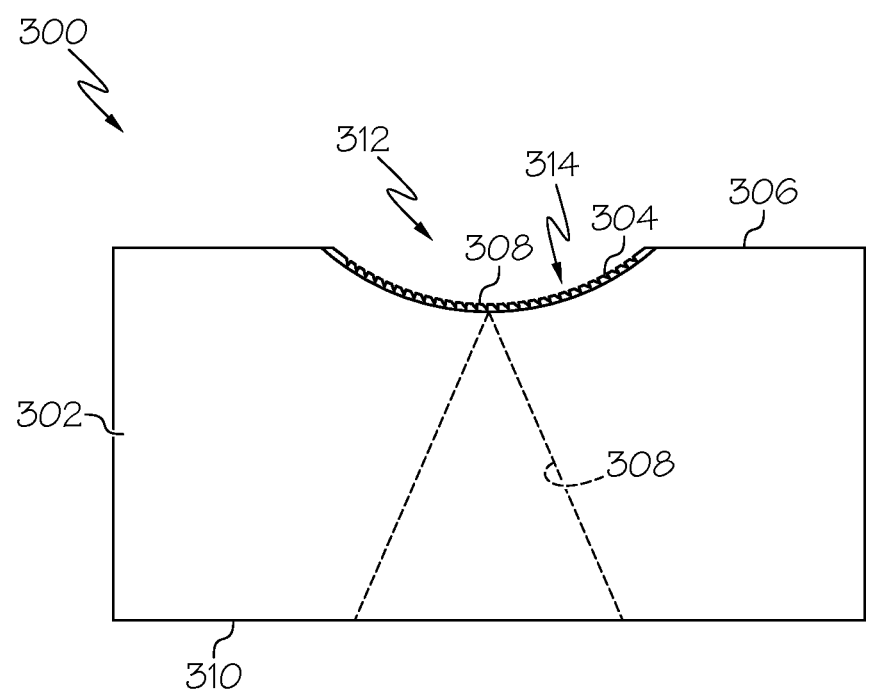
FIG. 3 schematically depicts an optical element formed using the method of FIG. 2, according to one or more embodiments described herein.

Referring now to FIG. 2, a flow diagram of a method 200 of forming an optical element is shown, according to an example embodiment. For example, the method 200 may be performed to fabricate the optical element 104 of the hyperspectral imaging system 100 described herein with respect to FIGS. 1A-1C, though optical elements having different forms may be formed using the method 200. In embodiments, for example, the method 200 may be used to form a diffraction grating. With reference to FIGS. 2-3, for example, an optical element 300 including an optical block 302 and a grating layer 304 formed on a first surface 306 of the optical block 302 may be formed using the method 200. Reference to the optical element 300 depicted in FIG. 3 will be made to aid in the description of the method 200.

At block 202, a first material is selected for the optical block 302. As described herein, in embodiments, the first material may be selected based on optical and thermal requirements of the application of the optical element 300. In embodiments, the optical element 300 may be designed to have a suitably high % transmission along an optical path 308 extending at least from a light incidence surface 310 of the optical block 302 to the first surface 306. The first material may be selected such that the % transmission along an entirety of the optical path 308 is at least 50% within a desired spectral range of interest. The spectral range of interest and length of the optical path 308 may vary depending on the implementation. In the hyperspectral imaging system 100 described herein with respect to FIGS. 1A-1C, for example, the first material of the optical block 118 may be selected to have a % transmission of greater than 70% along the entirety of the optical path 130 in the spectral range from 400 nm to 2500 nm. The % transmission requirements (e.g., the length of the optical path 308 and/or the spectral range of interest) may vary, rendering materials different than those described herein with respect to FIGS. 1A-1C suitable for the first material of the optical block 302.

In embodiments, the first material of the optical block 302 may also be selected based on thermal conditions that the optical element 300 may be exposed to and other elements that may be in contact with the optical block 302. For example, in embodiments, the first material of the optical block 302 may be selected to have a CTE that substantially conforms (e.g., differs by less than a threshold, or less than or equal to 8 ppm/° C.) to that of another element that may be contact with the optical element (e.g., as described above with respect to the connector material 140 and the optical block 118 depicted in FIGS. 1A-1C). In embodiments, when the optical element 300 is subjected to extreme temperature variations (e.g., at least 100 K of variation) over relatively short amounts of time (e.g., less than 6 hours), the first material may also be selected to have favorable thermal shock resistance qualities. In embodiments, the first material of the optical block 302 may be selected to have an index of refraction that lies within a desired range. For example, similar to the optical block 118 described herein with respect to FIGS. 1A-1C, in embodiments where the optical block 302 is a component of a monolithic spectrometer, it may be desirable if the index of refraction of the material is greater than or equal to 1.7 to facilitate the monolithic spectrometer having a compact design. In embodiments, the first material comprises a hard oxide such as undoped YAG. In embodiments, the first material comprises another suitable material such as sapphire, aluminum oxynitride, spinel, or any other suitable material meeting the optical and thermal requirements described herein.

At block 204, once the first material is selected, a plurality of surfaces are formed in the optical block 302 using deterministic polishing. In embodiments, a suitable machine (e.g., a CNC polisher) is used to shape surfaces of the optical block 302 (e.g., the surface 306, the light incidence surface 310, or various other not depicted portions thereof to form additional optical components on or in the optical block 302). In embodiments, various parameters of the polishing machine (e.g., tool speed, part speed, and the like) are controlled based on localized errors that are detected (e.g., via a suitable metrology device) to ensure the plurality of surfaces conform to desired geometries.

In embodiments, the plurality of surfaces of the optical block 302 that are shaped using deterministic polishing form one or more optical components. For example, the optical element 300 is depicted to include a grating cavity 312 (or grating pocket). The grating cavity 312 is formed by polishing a curved portion into the surface 306 of the optical block 302. In embodiments, the surface 306 may be shaped in accordance with any desired surface profile depending on the optical requirements of the optical element 300. Accordingly, the portion of the surface 306 that is shaped to form the grating cavity 312 may follow any suitable geometry (e.g., a curved surface, a concave surface, a spherical surface, a toroidal surface, an aspheric surface, a freeform surface, etc.). In embodiments, the grating cavity 312 may be omitted (e.g., when it is desired to form a substantially flat or planar diffraction grating using the materials described herein).

In embodiments, various other portions of the optical block 302 may be shaped using deterministic polishing to form other optical components, such as optical reflectors. For example, in embodiments where the optical block 302 is shaped to form a monolithic spectrometer, various other surfaces may be formed on the optical block 302 to form one or more optical reflectors, an entrance slit, and an exit surface along the optical path 308. The shaping of the optical block 302 may result in the formation of any suitable combination of optical elements, having any suitable combination of shapes. In embodiments, multiple grating cavities may be formed in the optical block 302 to facilitate the formation of a plurality of diffraction gratings in the optical block 302.

In a step 206, after the optical block is shaped, a grating layer 304 is deposited on one of the plurality of surfaces of the optical block 302. For example, as depicted in FIG. 3, the grating layer 304 is disposed within the grating cavity 312 on the surface 306. The grating layer 304 may be formed using any suitable deposition technique (e.g., chemical vapour deposition, sputtering, plating). In embodiments, the grating layer 304 comprises a thickness that is similar to the thickness 142 of the grating layer 120 described herein with respect to FIGS. 1A-1C (e.g., greater than or equal to 10 μm and less than or equal to 100 μm, greater than or equal to 40 μm and less than or equal to 50 μm). In embodiments, after the grating layer 304 is deposited, the grating layer 304 may be shaped using a suitable polishing technique to form an external surface thereon having a suitable geometry (e.g., a spherical surface, a toroidal surface, an aspheric surface, a freeform surface, etc.).

In embodiments, the grating layer 304 includes a zinc chalcogen. In embodiments, the grating layer 304 includes one or more of ZnS, ZnSe, ZnO, ZnSO, and ZnSbO. In embodiments, the grating layer includes a thickness that is greater than or equal to 10 μM and less than or equal to 100 μM. Such a thickness range for the grating layer 304 beneficially reduces the native absorption and scattering effects associated with layer so larger thicknesses and facilitates utilization of materials for the grating layer 304 not previously incorporated into monolithic spectrometer blocks.

At block 208, a plurality of diffraction grating features 314 are patterned into the grating layer 304. The plurality of diffraction grating features 314 (e.g., grooves or cavities of another form) may be patterned via diamond machining as a negative of a pattern for a desired diffraction grating that may be encountered by light entering the optical block 302 at the light incidence surface 310. For example, one or more machine tools (e.g., lathes, turn mills, rotary transfers) including a diamond tip may be applied to a surface of the grating layer 304 to form the plurality of diffraction grating features 314 having a desired pattern. In embodiments, the quality of finish and form accuracy of the grating layer 304 is monitored via one or more detection systems (e.g., laser profilometers, laser interferometers, microscopes, and the like) to control the one or more machine tools during the diamond turning to ensure the plurality of diffraction features possess desired surface qualities. In embodiments, the plurality of diffraction grating features 314 include blazed surfaces (e.g., single or dual facet blazed surfaces, powered blazed surfaces) which are tilted at a blaze angle that varies across the first surface 306. A variety of forms of diffraction gratings, with the plurality of diffraction grating features 314 including a variety of different surface forms, are contemplated and within the scope of the present disclosure.

At block 210, a reflector layer (not shown) is deposited onto the plurality of diffraction grating features 314 in the grating layer 304. The reflector layer may include a metallic layer deposited onto the plurality of diffraction grating features 314 via a suitable deposition technique (e.g., sputtering). This results in the formation of a reflective grating positioned to diffract light that enters the optical block via the light incidence surface 310. It should be understood that the method 200 may omit various processing steps for the purposes of discussion and that additional steps may be included depending on the form of the optical element 300. For example, additional reflector layers may be deposited on additional portions of the optical block 302 that were shaped via the deterministic polishing at block 204. Such additional reflector layers may modify the optical path 308 to a shape desired for a particular application (e.g., where the optical element 300 is a monolithic spectrometer block).

In view of the foregoing description, it should be understood that optical elements including optical blocks constructed of a first material and grating layers constructed of a second material have been disclosed. The first and second materials may be selected to provide optical characteristics (e.g., % transmission, refractive index) within a spectral range of interest for a particular optical element. In embodiments, the first material is selected to have a % transmission of greater than 70% over an optical path length that is greater than 10 cm. The first material may also be selected to have a refractive index of greater than 1.7 throughout a particular spectral range of interest to facilitate the optical element being compact for particular tactical use cases (e.g., on unmanned aerial vehicles, satellites, or other locations). In embodiments, the spectral range of interest for the optical element may extend between 400 nm and 2500 nm, rendering only hard oxides that are incompatible with diamond machining techniques typically employed to form diffraction gratings. The second material may be selected to enable formation of diffraction gratings while maintaining the high optical performance associated with the first material. Such a configuration beneficially permits utilization of more non-diamond machinable materials (than those associated with the optical block) having favorable thermal properties (e.g., thermal shock resistance and coefficient thermal expansion) for deployment in conjunction with cryogenic detectors.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An optical element comprising:
   an optical block constructed of a first material having a percent transmission of at least 50% throughout a spectral range of 300 nm to 2700 nm through at least a thickness of the optical block, wherein the optical block comprises a surface offset from an entrance surface; and
   a grating layer constructed of a second material disposed on the surface of the optical block, the grating layer comprising a second surface that is directly in contact with the surface of the optical block and a first surface comprising a plurality of diffraction features forming a diffraction grating.

2. The optical element of claim 1, wherein the first material comprises a hardness of greater than Knoop 500 and the second material comprises a hardness of less than or equal to Knoop 300.

3. The optical element of claim 1, wherein the first material comprises yttrium aluminum garnet.

4. The optical element of claim 1, further comprising:
   a reflective layer disposed on the grating layer; and
   one or more additional reflective layers disposed directly on the optical block, the one or more additional reflective layers defining an optical path extending through the optical block from a light incidence surface of the optical element, wherein light incident on the optical element at the light incidence surface reflects off both the one or more additional reflective layers and the reflective layer disposed on the grating layer.

5. The optical element of claim 4, wherein:
   the optical path comprises a length that is greater than or equal to 10 cm; and
   the percent transmission of the first material is at least 70% throughout the spectral range along an entirety of the optical path.

6. The optical element of claim 1, wherein the second material is a zinc chalcogen.

7. The optical element of claim 1, wherein the second material includes one or more of ZnS, ZnSe, ZnO, and ZnSO.

8. The optical element of claim 1, wherein the grating layer comprises a grating layer thickness that is greater than or equal to 10 μm and less than or equal to 100 μm.

9. The optical element of claim 8, wherein:
   the plurality of diffraction features comprises a plurality of grooves disposed on the first surface, and
   the plurality of grooves extend inward toward the second surface by no more than half of a thickness of the grating layer.

10. The optical element of claim 9, wherein each of the plurality of grooves comprises a dual faced blaze surface.

11. The optical element of claim 1, wherein the optical block is a monolithic spectrometer comprising:
    an entrance slit initiating an optical path through the monolithic spectrometer;
    a first reflector facing the entrance slit to reflect light propagating through the entrance slit onto the grating layer; and
    an exit surface positioned to refract the light after being diffracted by the grating layer out of the monolithic spectrometer.

12. The optical element of claim 1, wherein the first material comprises a coefficient of thermal expansion ("CTE") of less than or equal to $15.0 \times 10^{-6}$ $K^{-1}$.

13. A hyperspectral imaging system comprising:
    a detector;
    a monolithic spectrometer configured to direct light to the detector along an optical path within the monolithic spectrometer, wherein the monolithic spectrometer is constructed of a first material having a percent transmission of at least 50% throughout a spectral range of 300 nm to 2700 nm along an entirety of the optical path; and
    a grating layer constructed of a second material disposed on a surface of the monolithic spectrometer offset from an entrance surface of the monolithic spectrometer, the grating layer comprising a second surface that is directly in contact with the surface of the monolithic spectrometer and a first surface comprising a plurality of diffraction features forming a diffraction grating such that the light is diffracted by the diffraction grating prior to reaching the detector.

14. The hyperspectral imaging system of claim 13, wherein:
    the optical path comprises a length that is greater than or equal to 10 cm; and
    the percent transmission of the first material is at least 70% throughout the spectral range along an entirety of the optical path.

15. The hyperspectral imaging system of claim 13, wherein the first material comprises a hardness of greater than Knoop 500 and the second material comprises a hardness of less than or equal to Knoop 300.

16. The hyperspectral imaging system of claim 13, wherein the first material comprises yttrium aluminum garnet.

17. The hyperspectral imaging system of claim 16, wherein the second material is a zinc chalcogen.

18. A method of fabricating an optical element comprising:
- forming a grating pocket in a workpiece of a first material using a deterministic polishing technique, wherein the first material comprises a hardness of greater than or equal to Knoop 1000;
- depositing a layer of a second material having a thickness greater than or equal to 10 μm and less than or equal to 100 μm onto the workpiece within the grating pocket;
- patterning a negative of a diffraction grating on an exposed surface of the layer of the diamond machinable material using diamond turning; and
- depositing a reflective layer on the exposed surface to form a reflective grating that diffracts light propagating through the workpiece onto the diffraction grating.

19. The method of claim 18, wherein the first material comprises yttrium aluminum garnet.

20. The method of claim 18, wherein the second material comprises a zinc chalcogen.

* * * * *